(No Model.) 2 Sheets—Sheet 1.
C. M. WITTERS.
TOBACCO PLANTER.
No. 537,739. Patented Apr. 16, 1895.
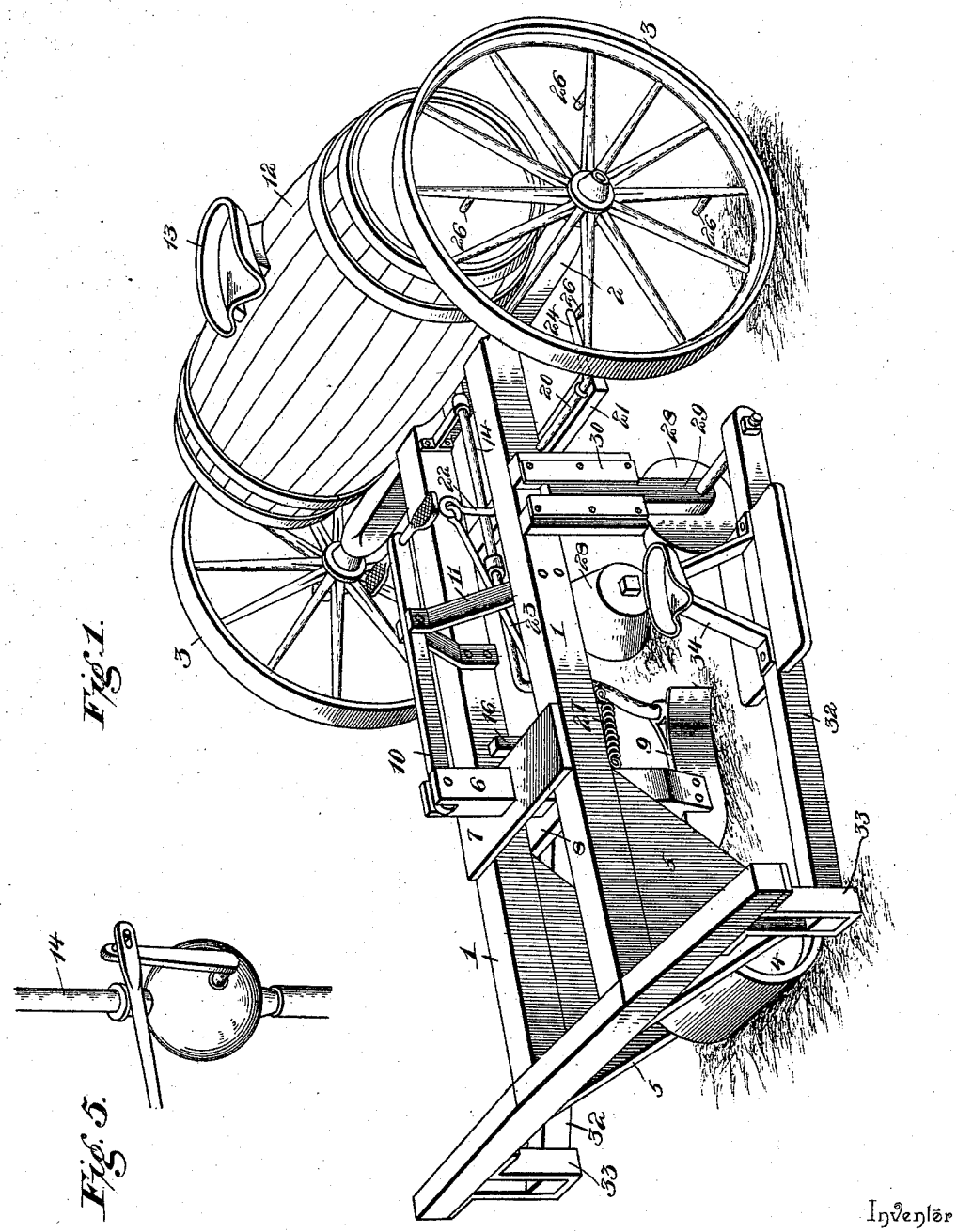
Witnesses
John C. Shaw
J. H. Riley
Inventor
Clarence M. Witters,
By his Attorneys.
C. A. Snow & Co.

(No Model.) 2 Sheets—Sheet 2.
C. M. WITTERS.
TOBACCO PLANTER.
No. 537,739. Patented Apr. 16, 1895.
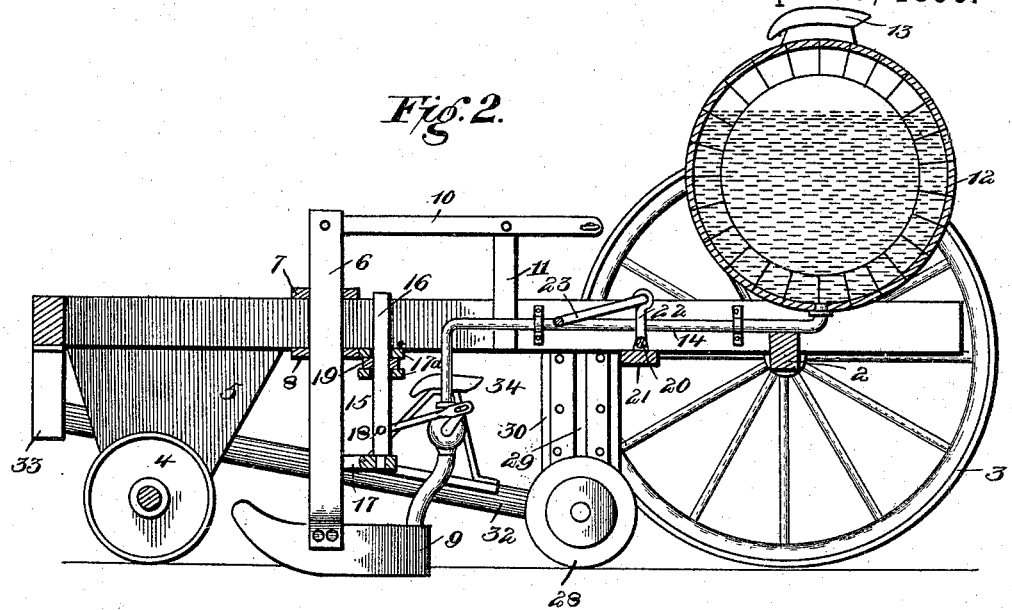
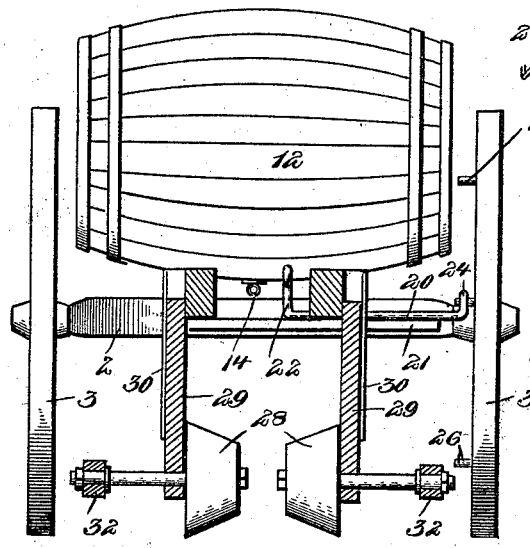
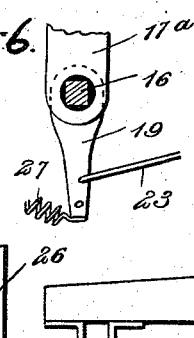
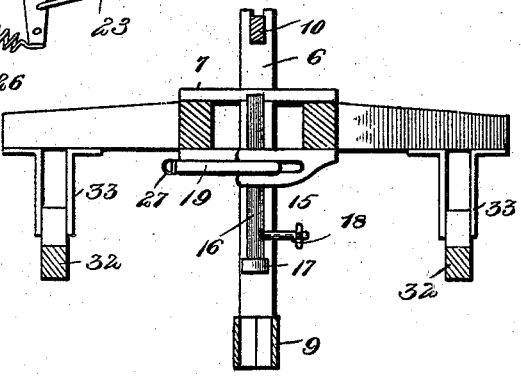
Witnesses
John C. Shaw.
J. F. H. Riley
Inventor
Clarence M. Witters,
By his Attorneys.
C. A. Snow & Co.

UNITED STATES PATENT OFFICE.

CLARENCE M. WITTERS, OF EATON, OHIO.

TOBACCO-PLANTER.

SPECIFICATION forming part of Letters Patent No. 537,739, dated April 16, 1895.

Application filed July 31, 1894. Serial No. 519,121. (No model.)

*To all whom it may concern:*

Be it known that I, CLARENCE M. WITTERS, a citizen of the United States, residing at Eaton, in the county of Preble and State of Ohio, have invented a new and useful Tobacco-Planter, of which the following is a specification.

The invention relates to improvements in tobacco planters.

The object of the present invention is to improve the construction of tobacco planters, and to provide a simple and comparatively inexpensive one, which will produce a furrow for the reception of plants, inject water into the same as the plants are set, and finally pack the plants in position.

A further object of the invention is to enable the planting mechanism to be readily adjusted by the foot of the driver to regulate the degree of penetration into the ground, and to adapt the planter to uneven ground, and at the same time leave the hands of the driver free.

The invention consists in the construction and novel combination and arrangement of parts hereinafter fully described, illustrated in the accompanying drawings, and pointed out in the claims hereto appended.

In the drawings—Figure 1 is a perspective view of a tobacco planter constructed in accordance with this invention. Fig. 2 is a central longitudinal sectional view. Fig. 3 is a transverse sectional view. Fig. 4 is a detail sectional view, illustrating the manner of mounting the planting mechanism. Fig. 5 is a detail view of the cutoff of the discharge pipe. Fig. 6 is a detail sectional view, illustrating the construction of the vertical rock-shaft, and the upper bearing thereof.

Like numerals of reference indicate corresponding parts in all the figures of the drawings.

1 designates a pair of longitudinal beams, supported at their rear ends by a transverse axle 2, on the ends of which are journaled ground wheels 3; and the beams are supported at their front ends by a leveling wheel 4 journaled in depending bearings 5, and located directly between the beams, and adapted to smooth the ground and prepare the same for the formation of a furrow. The beams are suitably connected between their ends, and in rear of the front wheel 4 is located a vertically adjustable standard 6, mounted in suitable ways, which are formed by vertically aligned openings of cross-pieces 7 and 8, and the said standard 6 carries at its lower end a furrow producing shoe 9, which opens the ground in rear of the front wheel 4.

The degree the furrow producing shoe penetrates into the ground, and its vertical adjustment to accommodate itself to uneven ground, are controlled by the driver through the medium of a horizontal foot lever 10 fulcrumed on a support 11 and pivoted at its front end to the standard, and provided at its rear end with a suitable foot piece or treadle.

The foot lever terminates in advance of a water containing barrel 12, mounted on the rear portions of the beams, and surmounted by a seat 13 for the accommodation of the driver.

A discharge pipe 14, of any suitable material, either flexible or rigid, extends from the bottom of the barrel forward, and terminates in rear of the furrow producing shoe, and is provided with a cutoff 15. The cutoff is operated by a spring actuated rock-shaft 16, vertically disposed and carried by the standard 6.

The lower end of the rock-shaft 16 is journaled in a horizontal bearing 17 of the standard 6. Above the bearing the rock shaft is polygonal, and is loosely arranged in a bifurcated bearing 17$^a$ of the supporting frame, which is formed by the parallel beams, and the axle and connections between the beam; and it is provided at its lower end with a horizontally disposed arm 18, which is connected with the cutoff, whereby when the rock-shaft is vibrated, a quantity of water will be injected into the furrow to moisten the soil around the plants and their roots. The vertical rock-shaft is loosely engaged by a laterally disposed arm 19, which is provided at its inner end with a polygonal opening conforming to the configuration of the shaft; and the inner end of the arm 19 is arranged in the bifurcation of the bearing 17$^a$, whereby the shaft is capable of vertical movement independent of the arm 19. This arm 19 is connected by a rod with a horizontal rock-shaft 20, journaled on a cross-piece 21 of the supporting frame, and provided at its inner end with a vertical arm 22, which is attached to the arm 23, and at its outer end with a horizontal arm 24, which is engaged at intervals by a series of tappets 26. The tappets 26 are located on the inner face of one of the ground wheels, and may be arranged at the desired intervals, whereby the rapidity of operation of the cutoff may be increased or diminished as desired. The cutoff is normally held closed by a spring 27 connected with the supporting frame and the arm 19 and holding the latter normally forward; but other means may be employed to effect this result.

The plants are set by pressing the loose soil at the sides of the furrow around the roots by means of vertically adjustable automatically operating tapered packing wheels 28, located in rear of the furrow producing shoe, and journaled on vertically movable slides 29, which are arranged in vertical ways 30 of the supporting frame. The axles 31 of the packing wheels are extended outward horizontally through the slides 29, and have mounted on them the rear ends of seat supporting bars 32, which have their front ends hingedly connected with the supporting frame and mounted in hangers 33. The bars 32 form platforms for the attendants and carry seats 34, for the accommodation of the plant droppers or setters, and their weight on the bars 32, which are disposed longitudinally of the machine, creates sufficient pressure to cause the packing wheels to set effectively the plants; and the vertical adjustment of the packing wheels, through the medium of the slides and the seat supporting bars enables them to adjust themselves automatically to the varying surface of the ground; and the independent movement of the packing wheels, enables one to pass over an obstruction without lifting the other.

The guiding devices between the rear ends of the platforms and the supporting frame cause the platforms to move vertically without any lateral play, but other constructions of guiding devices may be employed.

The tobacco planter is designed to be provided with a suitable tongue, and with any suitable means for raising the front of the planter in turning.

It will be seen that the tobacco planter is simple and comparatively inexpensive in construction, that it is capable of forming a furrow for the reception of plants, of ejecting water into the same, and of packing and setting the plant, and that the weight of the plant droppers creates the necessary pressure, and greatly facilitates the automatic adjustment of the packing wheels.

It will also be apparent that as the vertically disposed rock-shaft is carried by and moves with the shoe standard, the cutoff will be positively operated, whether the shoe be high or low.

Changes in the form, proportion, and the minor details of construction may be resorted to without departing from the principle or sacrificing any of the advantages of this invention.

What I claim is—

1. In a tobacco-planter, the combination of a supporting frame, a furrow-producing shoe, platforms located at opposite sides of the supporting frame and pivoted at their front ends to the same and capable of upward and downward movement independent of the frame and of each other, packing wheels supporting the rear ends of the platforms, seats carried by the platforms and located between the pivot points and the wheels, and guiding devices between the rear ends of the platforms and the supporting frame substantially as described.

2. In a tobacco planter, the combination of a supporting frame provided with vertical ways, a furrow producing shoe located in advance of the ways, vertically movable slides mounted in the ways, packing wheels located in rear of the shoe and journaled on the slides and capable of vertical movement independent of each other, and the seat supporting bars located at opposite sides of the supporting frame and having their front ends hingedly connected therewith, and connected at their rear ends with said slides, substantially as described.

3. In a tobacco planter, the combination of a supporting frame, a standard vertically movable thereon, a furrow producing shoe arranged at the lower end of the standard, a bifurcated bearing arranged on the supporting frame, a vertically disposed rock-shaft journaled on the standard and carried thereby and loosely arranged in said bearing, an arm arranged in the bifurcation of the bearing and loosely engaging the vertical rock-shaft, a discharge pipe having a cutoff connected with the rock-shaft, wheels supporting the frame, tappets arranged on one of the wheels, and a horizontal rock-shaft journaled on the supporting frame and provided at its inner and outer ends with arms, the inner one being connected with the arm of the vertical rock-shaft and the outer one being arranged to be engaged by the tappets, substantially as described.

4. In a tobacco planter, the combination of a supporting frame, ground-wheels, a vertically movable standard mounted on the supporting frame and carrying a furrow producing shoe, a vertically disposed rock-shaft journaled on and carried by the standard, a discharge pipe having a cutoff connected with the rock-shaft, a horizontal arm mounted on the supporting frame and loosely engaging the vertical rock-shaft, tappets arranged on one of the ground wheels, a horizontal rock-shaft arranged to be engaged by the tappets and connected with the said horizontal arm, and a lever fulcrumed on the supporting frame and connected with the standard and arranged to be operated by the foot, substantially as described.

In testimony that I claim the foregoing as my own I have hereto affixed my signature in the presence of two witnesses.

CLARENCE M. WITTERS.

Witnesses:
GEORGE F. CUTEN,
JOHN P. NEAL.